Patented May 3, 1949

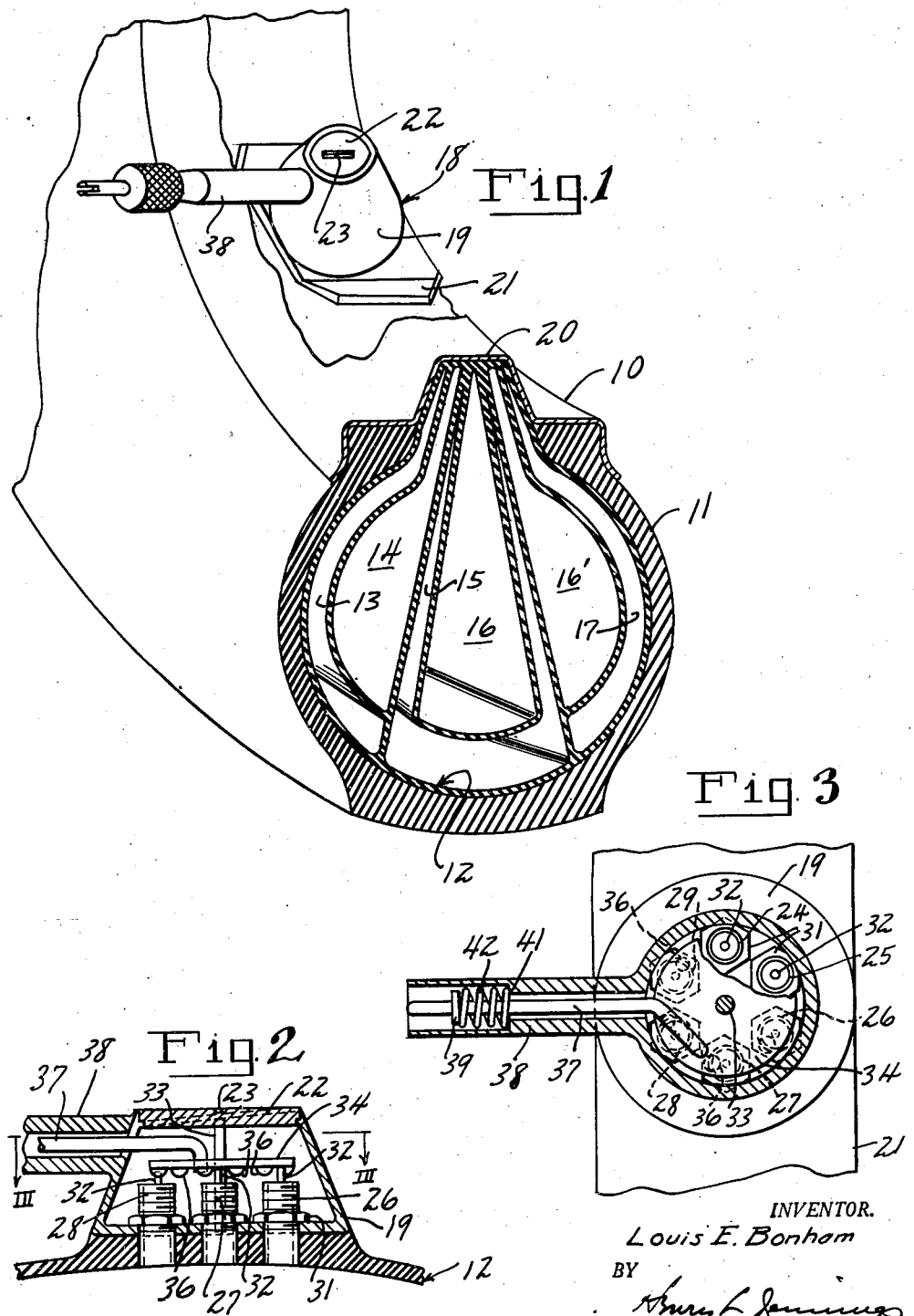

2,468,954

UNITED STATES PATENT OFFICE 2,468,954

VALVE FOR MULTICELL INNER TUBES

Louis E. Bonham, Birmingham, Ala.

Application December 14, 1946, Serial No. 716,398

5 Claims. (Cl. 152—429)

My present invention relates to an improvement in multicell innertubes and more particularly to an improved actuating mechanism for the valves of multicell innertubes, and has for an object the provision of a simple yet positively operable means for effecting the simultaneous opening of a plurality of inflation valves employed with such innertubes.

A further object of my invention is to provide a valve actuating mechanism for use in conjunction with multi-cell innertubes which comprises a small disk rotatably mounted in close proximity to the projecting stems of the inflation valves, and in which each inflation valve is depressed to open position by means of a small protuberance carried by the underside of the disk.

A further object of my invention is to provide a valve actuating mechanism of the class described in which the disk is rotatable by means of a rod connected therewith, the outer end of the rod being movable inwardly to rotate the disk when an air hose chuck is applied to inflate the tube.

A further object is to provide a valve actuating mechanism for use in conjunction with multicell innertubes in which the inflation valves controlling the various cells of the tube are readily accessible, thus facilitating replacement of the same.

My invention is illustrated in the accompanying drawings forming a part of this application in which:

Fig. 1 is a fragmentary perspective view partly broken away of a wheel and casing containing a multicell innertube having mounted thereon my improved valve mechanism.

Fig. 2 is a fragmentary sectional view through the housing of the valve actuating mechanism, and Fig. 3 is a detail sectional view taken along line III—III of Fig. 2.

Referring now to the drawings for a better understanding of my invention, I show in Fig. 1 a portion of a rim 10 having mounted thereon an outer casing 11. Within the casing is a multicell innertube indicated generally by the numeral 12. The tube comprises a plurality of compartments 13 to 17 inclusive, each of the compartments being separate from the other in a manner well understood.

My improved valve actuating mechanism, indicated generally by the numeral 18, comprises a housing 19 which is frusto-conical in shape thereby to fit within the drop center portion 20 of the rim 10. The housing 19 preferably is made of an integral part of the usual innertube depressor plate 21 though it may be formed separately if desired. The housing is made airtight by means of a threaded cover 22 which may have formed therein a kerf 23 for screwing and unscrewing the cover into the top of the housing.

The plate 21 and housing 19 carried integrally therewith, are secured to the projecting stems 24 to 29, inclusive of the tube inflation valve stems by means of flat nuts 31. The valve stems each carry an inflation valve of the usual type, the ends of which project out of the stems 24 to 29 as indicated at 32. These valves control the entrance of air into and out of the various compartments of the multicell tube in the manner well understood.

A small pin 33 has its upper end journaled in the cover 22 and its lower end journaled in the base of the housing. Secured to the pin 33 and mounted in close proximity to the projecting ends 32 of the inflation valve is a disk 34. The disk is provided on its underside with a plurality of protuberances 36 which project beneath the plate sufficiently to engage and depress the ends 32 of the inflation valves when the plate is rotated, it being understood that the protuberances are arranged concentrically with respect to the center of plate 34 and disposed on a radius to overlie the projecting ends 32 of the valves.

Rotatably secured to one side of the disk 34 is one end of an actuating rod 37. The rod passes outwardly of the housing through a suitable air passage and guide tube 38 and carries adjacent its outer end a washer 39. The air passage 38 is shouldered as indicated at 41 and between this shoulder and the washer 39 is interposed a spring 42.

From the foregoing the operation of my improved valve actuating mechanism will be readily understood. When an air hose chuck is applied to the outer end of the tube 38, the actuating rod 37 is pressed inwardly thereby rotating the disk 34. This rotates each of the small protuberances 36 into position over its respective projecting end 32 of the inflation valves, thereby depressing the same and opening the valves. Air is thus supplied to all of the various compartments of the innertube through the passage 38. It will be apparent, therefore, that when the actuating rod 37 is pressed inwardly, all of the inflation valves are opened equally, thus insuring equal inflation of each of the innertube compartments. When a gauge is applied to the end of passage 38, the valves are likewise opened, and an accurate pressure reading is obtained.

From the foregoing it will be apparent that I have devised an improved and simple actuating mechanism for a plurality of valves employed with multicell innertubes. While I have shown the housing 19 as affixed to the innertube by means of the nuts 31 threaded onto the projecting stems 24 to 29 of the innertube inflation valve assembly, it will be apparent that the housing may be secured to the tube in other ways, as for instance, by vulcanizing the same directly to the tube. If desired, the drop center portion 20 of the rim may be provided with a hole large enough to pass the housing 19, in which case the depressor plate may be omitted and the housing secured directly to the tube.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In actuating mechanism for the valves of a multicell innertube, a housing, a rotatable disk in the housing, a plurality of protuberances on one side of the said disk adapted upon rotation of the disk to engage and open the inflation valves of said innertube, and an actuating rod associated with said disk adapted upon inward movement to rotate the disk.

2. In a multicell innertube embodying a plurality of inflation valves, a closed housing surrounding the valves, a disk rotatably mounted over the outer ends of the inflation valves, a plurality of protuberances on the side of the disk adjacent the inflation valves adapted upon rotation of the disk to engage and open the valves, means operable from without the housing to rotate the disk, and a spring urging the disk to a position with the protuberances out of engagement with their associated inflation valves.

3. In a multicell innertube embodying a plurality of inflation stems and valves, a closed housing surrounding the outer end of the stems, a disk within the housing rotatably mounted over the ends of the valves, a plurality of protuberances on the disk disposed to engage and open the inflation valves upon rotation of the disk, an air admission passage for the housing, a rod for rotating the disk disposed in the passage and having one end pivotally connected to the disk adjacent the periphery thereof, and a spring associated with the rod urging the disk to a position with the protuberances out of engagement with their associated inflation valves.

4. In a multicell innertube embodying a plurality of inflation valves with the stems thereof disposed in a circle and with the ends of the valves projecting out of the stems, a closed housing surrounding the stems, a pintle in the housing positioned centrally of the valve stem circle, a disk mounted on the pintle and disposed over the ends of the valve stems, a plurality of protuberances on the disk disposed concentrically with respect to the valve stems and disposed to engage and depress the projecting ends of the inflation valves, an air passage for admitting air to the housing, a rod in the passage having one end pivotally connected to the disk adjacent the periphery thereof, and a spring associated with the rod urging the disk to a position with the protuberances out of engagement with the valves.

5. In a multicell innertube embodying a plurality of inflation valves with the stems thereof having valve ends projecting outwardly, a housing having an opening at its top, a cover for the housing, a pintle journaled at one end of the cover and the other is the bottom of the housing, a disk of less diameter then the housing opening mounted for rotation with the pintle, a plurality of protuberances on the disk adapted upon rotation thereof to contact and depress the projecting ends of the inflation valves, a passage for admitting air to the housing, a rod in the air passage having its inner end pivotally connected to the periphery of the disk, and a spring urging the rod outwardly thereby to hold the protuberances out of engagement with the inflation valves.

LOUIS E. BONHAM.

REFERENCES CITED

The following references are of record in the file of this patent:

UNITED STATES PATENTS

| Number | Name | Date |
|--------|------|------|
| 601,211 | Mears | Mar. 22, 1898 |
| 1,569,844 | O'Brien | Jan. 12, 1926 |